United States Patent
Jo

(10) Patent No.: US 8,391,625 B2
(45) Date of Patent: Mar. 5, 2013

(54) IMAGE PROCESSING APPARATUS FOR IMAGE QUALITY IMPROVEMENT AND METHOD THEREOF

(75) Inventor: Gye-wook Jo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1049 days.

(21) Appl. No.: 12/388,558

(22) Filed: Feb. 19, 2009

(65) Prior Publication Data

US 2009/0290803 A1 Nov. 26, 2009

(30) Foreign Application Priority Data

May 26, 2008 (KR) .................. 10-2008-0048640

(51) Int. Cl.
*G06K 9/40* (2006.01)
(52) U.S. Cl. ...................... 382/254; 382/274
(58) Field of Classification Search .................. 382/254, 382/232, 233, 274, 275
See application file for complete search history.

(56) References Cited

U.S. PATENT DOCUMENTS

| | | | |
|---|---|---|---|
| 7,297,062 B2 * | 11/2007 | Gatto et al. | 463/42 |
| 7,522,208 B2 * | 4/2009 | Shiohara | 348/333.06 |
| 7,536,058 B2 * | 5/2009 | Matsutani | 382/239 |
| 2005/0046902 A1 * | 3/2005 | Sugimoto | 358/3.01 |
| 2006/0140268 A1 * | 6/2006 | Ha et al. | 375/240.03 |
| 2006/0220984 A1 * | 10/2006 | Miyasaka | 345/1.1 |
| 2009/0129692 A1 * | 5/2009 | Shikata et al. | 382/254 |

FOREIGN PATENT DOCUMENTS

KR 10-2006-0076175 A 7/2006

\* cited by examiner

*Primary Examiner* — Yon Couso
(74) *Attorney, Agent, or Firm* — Sughrue Mion, PLLC

(57) ABSTRACT

An image processing apparatus and a method thereof are disclosed. The image processing apparatus includes a storage unit which stores a plurality of image correction values, a control unit which extracts information on compression rate, and an image correcting unit which corrects an image using image quality correction values.

18 Claims, 3 Drawing Sheets

|  | 2Mbps | 4Mbps | 6Mbps | 8Mbps |
|---|---|---|---|---|
| N/R | $a_4$ | $a_3$ | $a_2$ | $a_1$ |
| Sharpness | $b_1$ | $b_2$ | $b_3$ | $b_4$ |
| Peaking | $c_1$ | $c_2$ | $c_3$ | $c_4$ |
| Coring | $d_4$ | $d_3$ | $d_2$ | $d_1$ |

IMAGE PROCESSING APPARATUS FOR IMAGE QUALITY IMPROVEMENT AND METHOD THEREOF

CROSS-REFERENCE TO RELATED APPLICATIONS

This application claims priority from Korean Patent Application No. 10-2008-0048640, filed on May 26, 2008 in the Korean Intellectual Property Office, the disclosure of which is incorporated herein by reference in its entirety.

BACKGROUND OF THE INVENTION

1. Field of the Invention

Apparatuses and methods consistent with the present invention relate to image processing for image quality improvement, and more particularly, to image processing which improves image quality by removing compression noise present on a compressed image, and a method thereof.

2. Description of the Related Art

Image data contain an enormous amount of information as compared to text data, and thus, a large amount of storage space is required to store the image data and a long period of time is required to transmit the image data.

In order to solve this problem, image data compression techniques have been developed, such as the Joint Photographic Experts Group (JPEG), Moving Picture Experts Group (MPEG), H.261 and H.264 techniques. The use of such compression techniques causes a remarkable reduction in the amount of image data, so storage and transmission of data can be performed efficiently.

However, as the amount of data is reduced due to the compression rate and the convenience of storage and transmission of data is increased, various digital artifacts arise which deteriorate image quality.

Therefore, there is demand for a method which can provide improved image quality by increasing the convenience of storing and transmitting image data using compression techniques by removing compression noise.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

The present invention provides an image processing apparatus and a method thereof which can remove compression noise and improve image quality by using compression information to compress the image.

According to an aspect of the present invention, there is provided an image processing apparatus comprising a storage unit which stores a plurality of image quality correction values for each image compression rate, a control unit which extracts the image compression rate of a received image, and an image processing unit which corrects the received image by using the plurality of image quality correction values corresponding to the image compression rate extracted by the control unit among the plurality of image quality correction values stored for each image compression rate of the storage unit.

The image processing unit may comprise a noise reduction (N/R) unit which removes compression noise using N/R values, and a sharpness unit which adjusts sharpness using sharpness values.

The N/R values may be set high as the image compression rate increases, and the sharpness values may be set high as the image compression rate decreases.

The image processing unit may comprise a peaking unit which emphasizes a predetermined frequency range using peaking values, and a coring unit which emphasizes a center frequency using coring values.

The peaking values may be set high as the image compression rate decreases, and the coring values may be set high as the image compression rate increases.

The image compression rate of the received image may be at least one of 2 Mbps, 4 Mbps, 6 Mbps and 8 Mbps.

The image processing unit may further comprise a decoding unit which decodes the received image, and wherein the image processing unit corrects an image decoded by the decoding unit.

The control unit may extract the image compression rate based on the image decoded by the decoding unit.

The control unit may transfer the extracted image compression rate to the image processing unit using an Inter-Integrated Circuit (I2C) method.

The storage unit may store the plurality of image quality correction values for each of a plurality of image compression rates using a look-up table.

According to another aspect of the present invention, there is provided an image processing method comprising extracting an image compression rate of a received image, and correcting the received image using a plurality of image quality correction values corresponding to the extracted image compression rate among the plurality of image quality correction values stored for each image compression rate.

The correcting may comprise removing compression noise using N/R values, and adjusting sharpness using sharpness values.

The N/R values may be set high as the image compression rate increases, and the sharpness values may be set high as the image compression rate decreases.

The correcting may further comprise emphasizing a predetermined frequency range using peaking values, and emphasizing a center frequency using coring values.

The peaking values may be set high as the image compression rate decreases, and the coring values may be set high as the image compression rate increases.

The image compression rate of the received image may be at least one of 2 Mbps, 4 Mbps, 6 Mbps and 8 Mbps.

The image processing method may further comprise decoding the received image, and wherein the correcting comprises correcting the decoded image.

The extracting may comprise extracting the image compression rate based on the decoded image.

The correcting may comprise correcting the image by using the extracted image compression rate transferred using an I2C method.

The storing may comprise storing the plurality of image quality correction values for each of a plurality of image compression rates using a look-up table.

BRIEF DESCRIPTION OF THE DRAWINGS

The above and/or other aspects of the present invention will be more apparent by describing certain exemplary embodiments of the present invention with reference to the accompanying drawings, in which.

DETAILED DESCRIPTION OF EXEMPLARY EMBODIMENTS

Figure 1:
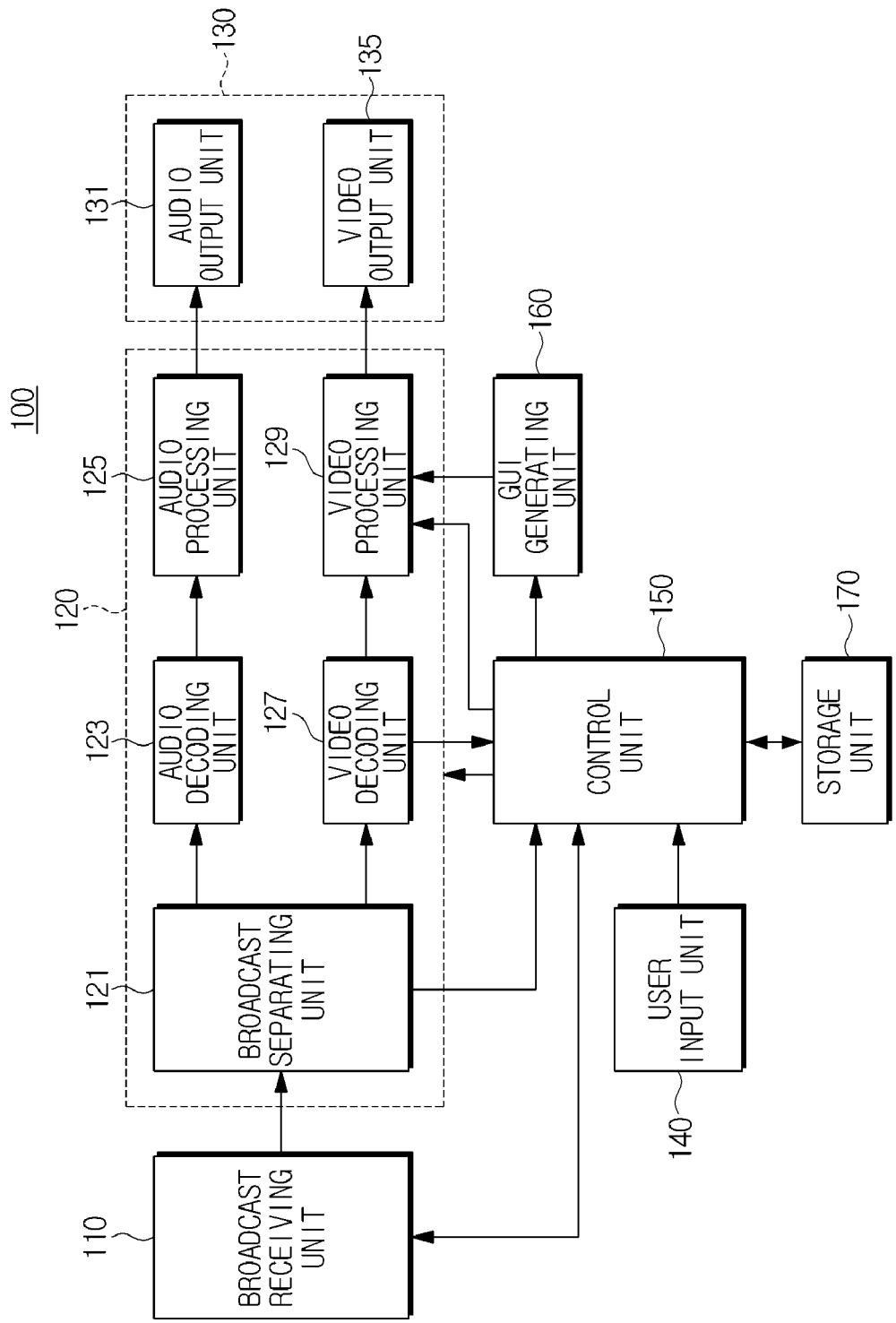
FIG. 1 is a block diagram of an exemplary digital television (DTV) 100 to which the exemplary embodiments of the present invention can be applied.

Certain exemplary embodiments of the present invention will now be described in greater detail with reference to the accompanying drawings.

In the following description, the same drawing reference numerals are used for the same elements even in different drawings. The matters defined in the description, such as the detailed construction and elements, are provided to assist in a comprehensive understanding of the invention. Thus, it is apparent that the exemplary embodiments of the present invention can be carried out without those specifically defined matters. Also, well-known functions or constructions are not described in detail since they would obscure the invention with unnecessary detail.

FIG. 1 is a block diagram of an exemplary digital television (DTV) 100 to which the exemplary embodiments of the present invention can be applied. The DTV 100 of FIG. 1 receives an image compressed at various compressions rates and transmitted, and decompresses the received image, thereby allowing a user to view the image.

The DTV 100 comprises a broadcast receiving unit 110, a broadcast processing unit 120, a broadcast output unit 130, a user input unit 140, a control unit 150, a graphical user interface (GUI) generating unit 160, and a storage unit 170.

The broadcast receiving unit 110 selects and demodulates any broadcast received through the air or a cable. The broadcast received by the broadcast receiving unit 110 may be, for example, a cable broadcast, a satellite broadcast or a terrestrial broadcast. In other words, there is no limitation as to the type of broadcasts received by the broadcast receiving unit 110. The broadcast receiving unit 110 has a tuner (not shown) which selects a desired broadcast.

The broadcast processing unit 120 performs signal processing on broadcast signals output from the broadcast receiving unit 110. The broadcast processing unit 120 comprises a broadcast separating unit 121, an audio decoding unit 120, an audio processing unit 125, a video decoding unit 127, and a video processing unit 129.

The broadcast separating unit 121 separates and outputs the broadcast signals output from the broadcast receiving unit 110 into audio signals, video signals and additional data. The audio signals and video signals separated from the broadcast signals are provided to the audio decoding unit 123 and the video decoding unit 127, respectively, to provide a broadcast program. The additional data separated from the broadcast signals is provided to the control unit 150 to provide additional information.

The audio decoding unit 123 decodes the audio signals output from the broadcast separating unit 121 and outputs decoded audio signals.

The audio processing unit 125 converts the decoded audio signals output from the audio decoding unit 123 into audio signals having a suitable output format. To achieve this, the audio processing unit 125 may perform a digital-to-analog (D/A) conversion on the audio signals.

The video decoding unit 127 decodes the video signals output from the broadcast separating unit 121 and outputs decoded video signals. The video decoding unit 127 extracts compression rate information from the decoded video signals, and provides the extracted compression rate information to the control unit 150.

The video processing unit 129 performs video signal processing on the decoded video signals output from the video decoding unit 127. More specifically, the video processing unit 129 receives the compression rate information from the control unit 150 and removes compression noise by performing the video signal processing on the decoded video signals according to the received compression rate information, thereby improving the image quality of the received image. Detailed description of the video processing unit 129 will be described later with reference to FIG. 2.

The GUI generating unit 160 generates a GUI to be displayed on the DTV 100, under the control of the control unit 150. The GUI generated by the GUI generating unit 160, which is a form of information displayed in order that a user may interface with the DTV 100, displays an operation of the DTV 100, as well as a menu screen or an electronic program guide (EPG) screen through which user instructions are received.

The GUI generated by the GUI generating unit 160 is applied to the video processing unit 129 and is thus added to the video output from the video decoding unit 127.

The output unit 130 outputs video and audio corresponding to the video signals and audio signals output from the broadcast processing unit 120 and provides them to the user. The output unit 130 which functions as described above includes an audio output unit 131 and a video output unit 135.

The audio output unit 131 outputs the audio signals output from the audio processing unit 125 through a speaker or outputs them to an external display device (for example, an external TV) connected through an external output terminal.

The video output unit 135 outputs the video signals output from the video processing unit 129 through a display or outputs them to an external display device (for example, an external TV) connected through an external output terminal.

The storage unit 170 is a storage medium in which data and programs required for the control unit 150 to control operation of the DTV 100 are stored. Also, a plurality of image quality correction values according to the compression rate are stored in a look-up table in the storage unit 170.

The user input unit 140 transfers to the control unit 150 user instructions input using buttons provided, for example, on a front panel of the DTV 100 and/or a remote controller, and the control unit 150 controls the operations of the DTV 100 according to the user instructions received from the user input unit 140.

More specifically, the control unit 150 controls the operations of the broadcast receiving unit 110 and the broadcast processing unit 120 in order to provide digital broadcast programs to a user.

Also, the control unit 150 extracts compression rate information of the image received from the video decoding unit 127.

The control unit 150 transfers the compression rate information extracted from the video decoding unit 127 and the image quality correction values according to the compression rate of the image received using the look-up table stored in the storage unit 170 to the video processing unit 129. The video processing unit 129 thereby removes compression noise according to the compression rate of the image received using the image quality correction values transferred from the control unit 150 and improves the image quality of the received image. At this time, the control unit 150 may be implemented to transfer the compression rate information and the image quality correction values to the video processing unit 129 using an Inter-Integrated Circuit (I2C) method.

Figures 2, 3:
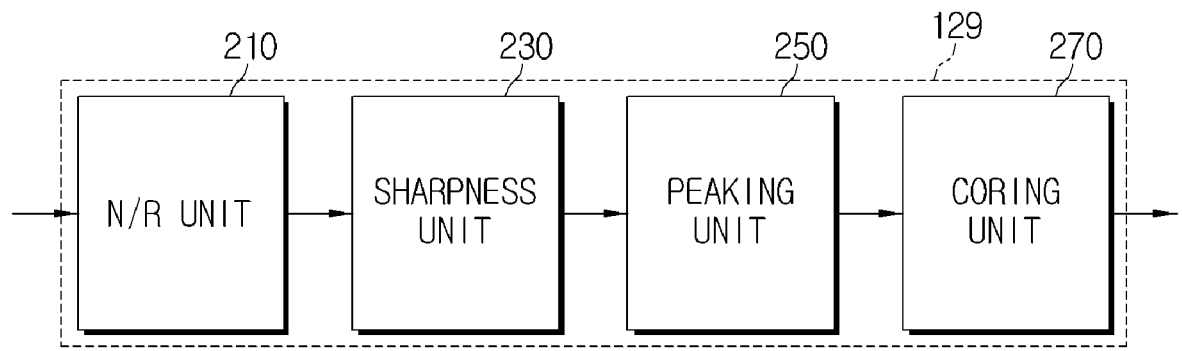
FIG. 2 is a block diagram of a video processing unit 129 according to an exemplary embodiment of the present invention.
FIG. 3 is an exemplary view of a look-up table stored in a storage unit.

Hereinafter, the operation of the video processing unit 129 will be described in detail with reference to FIGS. 2 and 3. FIG. 2 is a block diagram of the video processing unit 129 according to an exemplary embodiment of the present invention.

As described above, the video processing unit 129 performs video signal processing on the decoded video signals output from the video decoding unit 127. The video signal processing described above is performed using the look-up table stored in the storage unit 170.

The storage unit 170 stores a plurality of image quality correction values according to the compression rate in a look-up table, as previously described. FIG. 3 is an exemplary view of a look-up table stored in a storage unit.

Referring to FIG. 3, the horizontal axis of the look-up table represents the data transmission speed, namely, the compression rate, and the vertical axis of the look-up table represents image quality correction factors.

The image quality correction factors include N/R, sharpness, peaking, and coring, wherein each image quality correction factor has an optimized value for the image correction according to the compression rate. For example, in the case of a 4 Mbps compression rate, the peaking factor has a peaking value of '$c_2$', wherein the value becomes the optimized value of the peaking factor when the compression rate is 4 Mbps.

In comparison to the values of the image quality correction factors, the N/R value and the coring value increase as the compression rates increase, but the sharpness value and the peaking value decrease as the compression rates increase. In other words, the image correction values have relationship in which a4>a3>a2>a1, b4>b3>b2>b1, c4>c3>c2>c1, and d4>d3>d2>d1.

The video processing unit 129 comprises an N/R unit 210, a sharpness unit 230, a peaking unit 250, and a coring unit 270.

When the compression rates are extracted from the image received from the video decoding unit 127, the control unit 150 extracts the N/R value, the sharpness value, the peaking value, and the coring value according to the extracted compression rates from the storage unit 170. When the N/R value, the sharpness value, the peaking value, and the coring value are extracted, the control unit 150 transfers the N/R value, the sharpness value, the peaking value, and the coring value, extracted from the storage unit 170, to the N/R unit 210, the sharpness unit 230, the peaking unit 250, and the coring unit 270, respectively.

The N/R unit 210 receives the decoded image from the video decoding unit 127, and removes compression noise included in the decoded image by using the N/R value according to the compression rate of the decoded image.

The compression noise described above increases as the compression rates increase. For example, in the case of a 2 Mbps transmission speed in which the compression rate is high, there is a substantial amount of compression noise on the received image, which is compressed at the compression rate. Therefore, the N/R unit corrects the image quality by applying the highest level of the N/R value '$a_4$'.

To the contrary, in the case of an 8 Mbps transmission speed in which the compression rate is low, there is less compression noise on the received image, which is compressed at the compression rate. Therefore, the N/R unit corrects the image quality by applying the lowest level of the N/R value '$a_1$'.

The N/R unit 210 transfers the image from which noise has been removed to the sharpness unit 230.

The sharpness unit 230 is used for improving sharpness of a boundary region of the image. The sharpness unit 230 improves the sharpness of the boundary region of the image by using vertical and horizontal filters.

There is a need to improve the sharpness of the boundary region described above as the compression rates decrease. In the case of an 8 Mbps transmission speed in which the compression rate is the lowest, there is a greater need to improve in the sharpness of the boundary region. Therefore, the sharpness unit 230 corrects the image quality by applying the highest level of the sharpness value '$b_4$'.

The sharpness unit 230 transfers the image of which the sharpness of the boundary region has been improved to the peaking unit 250.

The peaking unit 250 is used for emphasizing a range of a predetermined frequency. A peaking function equalizes amplifying characteristics over an entire frequency range from low parts to high parts by specifically emphasizing high frequency parts or low frequency parts of image signals, in order to equalize the amplifying characteristics over the entire frequency range of the image signals. The peaking function is generally used for improving sharpness by compensating for the low frequency parts.

There is a need to improve the sharpness by the peaking function described above as the compression rates decreases. In the case of an 8 Mbps transmission speed in which the compression rate is the lowest, there is a greater need to improve the sharpness by the peaking function. Therefore, the peaking unit 250 corrects the image quality by applying the highest level of the peaking value '$c_4$'.

The peaking unit 250 transfers the image of which the sharpness has been improved to the coring unit 270.

The coring unit 270 is used for removing brightness signals below a predetermined critical level from an input image and detecting only bright signals above the critical level. In other words, the coring function emphasizes the center frequency.

There is a need to improve the coring function as the compression rates increase. In the case of a 2 Mbps transmission speed in which the compression rate is the highest, there in a greater need to improve the coring function for emphasizing the center frequency. Therefore, the coring unit 270 corrects the image quality by applying the highest level of the coring value '$d_4$'.

The coring unit 270 transfers the image of which the center frequency has been emphasized to the video output unit 135.

The present exemplary embodiment describes the case in which the video processing unit 129 includes the N/R unit 210, the sharpness unit 230, the peaking unit 250, and the coring unit 270. However, the present exemplary embodiment is provided only for convenience of explanation and thus can of course further include an additional signal processing element. For example, the video processing unit 129 can further include a scaler (not shown) which converts a received image by enlarging or reducing it to meet screen size.

Although the present exemplary embodiment describes the case in which the video processing unit 129 includes all four image quality correction factors, the N/R unit 210, the sharpness unit 230, the peaking unit 250, and the coring unit 270, the present invention is not limited thereto. The present invention may be implemented to include, for example, only two or three of the image quality correction factors.

As described above, the present embodiment describes the case in which the image is corrected in order of the N/R unit 210, the sharpness unit 230, the peaking unit 250, and the coring unit 270, in order to remove compression noise. However, the present invention is not limited thereto. The present invention may be implemented in any other order.

Figure 4:
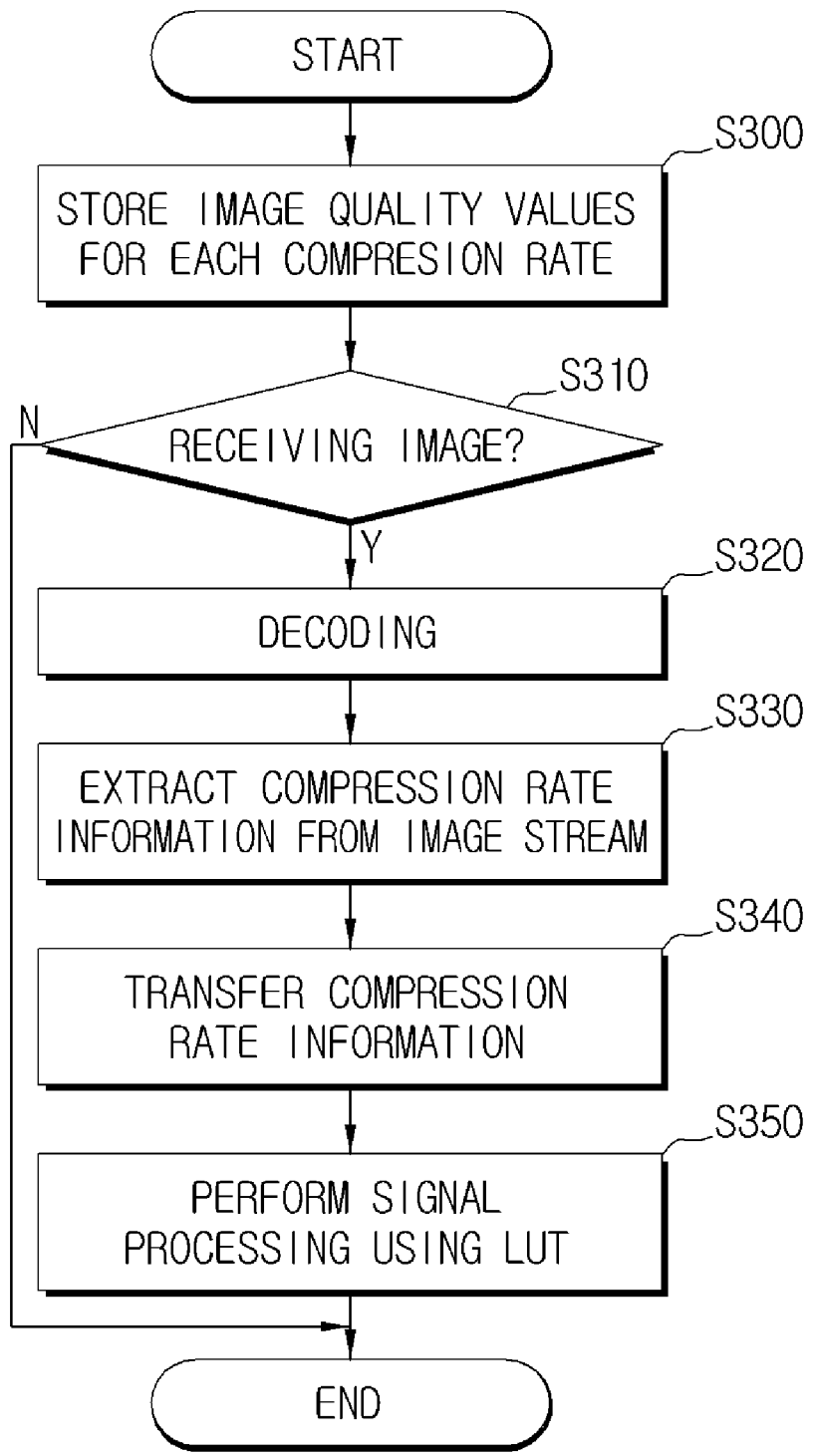
FIG. 4 is a flow chart showing an image processing method according to an exemplary embodiment of the present invention.

FIG. 4 is a flow chart showing an image processing method according to an exemplary embodiment of the present invention.

First, a control unit 150 controls image correction values according to the compression rates of an image to be stored in a storage unit 170 for each compression rate (S300). In other words, the storage unit 170 is stored with the image quality correction values for the N/R, sharpness, peaking, and coring according to the respective compression rates (transmission speed) of 2 Mbps, 4 Mbps, 6 Mbps, and 8 Mbps, as a look-up table.

Thereafter, if an image is received using a broadcast receiving unit 110 (S310-Y), the broadcast receiving unit 110 transfers the received image to a video decoding unit 127, and the video decoding unit 127 decodes the transferred image (S320).

The control unit 150 extracts compression rate information from the decoded image (S330), and transfers the extracted compression rate information and the image quality correction values according to the compression rates stored in the storage unit 170 to a video processing unit 129 (S340).

Thereafter, the video processing unit 129 performs signal processing by using the image quality correction values stored in the storage unit 170 as a look-up table, in order to improve image quality by removing compression noise (S350).

By way of example, the present exemplary embodiment describes a DTV, in which the method to improve the image quality of the received compressed image is given. However, the present exemplary embodiment is provided only for convenience of explanation. Therefore, any apparatus to receive or output a compressed image can be applied to the technical idea of the present invention.

Although the present embodiment describes the case in which the video processing unit 129 includes the N/R unit 210, the sharpness unit 230, the peaking unit 250, and the coring unit 270, that is provided only for convenience of explanation. Therefore, the technical idea of the present invention can still be applied, even in the case in which another block, which corrects image quality using another image quality correction value instead of N/R, sharpness, peaking, and coring, is included.

The present invention can also be implemented to include, for example, two or three units from among the N/R unit 219, the sharpness unit 230, the peaking unit 250, and the coring unit 270. For example, the video processing unit 129 can perform image quality correction using only the N/R value and the sharpness value by including only the N/R unit 210 and the sharpness unit 230. In other words, for example, the N/R and sharpness are the most important image quality correction factors for correcting the overall image quality, and the peaking and the coring are the auxiliary image quality correction factors, so the video processing unit 129 may perform image quality correction by including only the N/R unit 210 and the sharpness unit 230.

The present embodiment describes a method to extract information on a compression rate from a decoded image and to improve image quality based on the information on the extracted compression rate. However, a method to extract information on compression rate using another method and to improve image quality can also be applied to the present invention. For example, the technical idea of the present invention can still be applied, even if a broadcast receiving unit 110 receives a compressed image, a control unit 150 separately extracts information only on a compression rate from the received compressed image and thus improve image quality based on the extracted compression rate.

The present embodiment describes the case in which compression rates are 2 Mbps, 4 Mbps, 6 Mbps, and 8 Mbps, however, the present invention is not limited thereto. A storage unit 170 can also be implemented to store image quality correction values for any compression rate other than the compression rates defined as above.

With the various exemplary embodiments of the present invention, an image is corrected using a plurality of image quality correction values stored for each of the compression rates, making it possible to minimize compression noise generated from the compressed image and maximize image quality of the image.

The foregoing embodiments are merely exemplary and are not to be construed as limiting the present invention. The present teaching can be readily applied to other types of apparatuses. Also, the description of the exemplary embodiments of the present invention is intended to be illustrative, and not to limit the scope of the claims, and many alternatives, modifications, and variations will be apparent to those skilled in the art.

What is claimed is:

1. An image processing apparatus comprising:
   a storage unit which stores a plurality of image quality correction values for each of a plurality of image compression rates,
   a control unit which extracts an image compression rate of a received video, and
   an image processing unit which corrects the received video by using the plurality of image quality correction values corresponding to the image compression rate extracted by the control unit among the plurality of image quality correction values stored in the storage unit,
   wherein the image processing unit comprises a peaking unit which emphasizes a predetermined frequency range using peaking values, and a coring unit which emphasizes a center frequency using coring values.

2. The apparatus as claimed in claim 1, wherein the image processing unit comprises a noise reduction (N/R) unit which removes compression noise of the received video using N/R values, and a sharpness unit which adjusts sharpness of the received video using sharpness values.

3. The apparatus as claimed in claim 2, wherein the N/R values increase as the image compression rate increases, and the sharpness values increase as the image compression rate decreases.

4. The apparatus as claimed in claim 1, wherein the peaking values increase the image compression rate decreases, and the coring values increase as the image compression rate increases.

5. The apparatus as claimed in claim 1, wherein the image compression rate of the received video is at least one of 2 Mbps, 4 Mbps, 6 Mbps and 8 Mbps.

6. The apparatus as claimed in claim 1, further comprising:
   a decoding unit which decodes the received video, and
   wherein the image processing unit corrects the video decoded by the decoding unit.

7. The apparatus as claimed in claim 6, wherein the control unit extracts the image compression rate based on the video decoded by the decoding unit.

8. The apparatus as claimed in claim 1, wherein the control unit transfers the extracted image compression rate to the image processing unit using an Inter-Integrated Circuit (I2C) method.

9. The apparatus as claimed in claim 1, wherein the storage unit stores the plurality of image quality correction values for each of the plurality of image compression rates using a look-up table.

10. An image processing method comprising:
   extracting, using a processor, an image compression rate of a received video, and
   correcting the received video by using a plurality of image quality correction values corresponding to the extracted image compression rate among a plurality of stored image quality correction values for each of a plurality of image compression rates,
   wherein the correcting comprises emphasizing a predetermined frequency range using peaking values, and emphasizing a center frequency using coring values.

11. The method as claimed in claim 10, wherein the correcting comprises removing compression noise of the received video using noise reduction (N/R) values, and adjusting sharpness of the received video using sharpness values.

12. The method as claimed in claim 11, wherein the N/R values increase as the image compression rate increases, and the sharpness values increase as the image compression rate decreases.

13. The method as claimed in claim 10, wherein the peaking values increase as the image compression rate decreases, and the coring values increase as the image compression rate increases.

14. The method as claimed in claim 10, wherein the image compression rate of the received video is at least one of 2 Mbps, 4 Mbps, 6 Mbps and 8 Mbps.

15. The method as claimed in claim 10, further comprising:
   decoding the received video,
   wherein the correcting comprises correcting the decoded video.

16. The method as claimed in claim 15, wherein the extracting comprises extracting the image compression rate based on the decoded video.

17. The method as claimed in claim 10, wherein the correcting comprises correcting the image using the extracted image compression rate transferred using an Inter-Integrated Circuit (I2C) method.

18. The method as claimed in claim 10, wherein the storing comprises storing the plurality of image quality correction values for each of the plurality of image compression rates using a look-up table.

\* \* \* \* \*